United States Patent
Kim et al.

(10) Patent No.: US 9,706,585 B2
(45) Date of Patent: Jul. 11, 2017

(54) METHOD AND APPARATUS FOR PERFORMING DEVICE TO DEVICE SERVICE IN WIRELESS COMMUNICATION SYSTEM

(71) Applicant: LG ELECTRONICS INC., Seoul (KR)

(72) Inventors: Hakseong Kim, Seoul (KR); Byounghoon Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 14/771,458

(22) PCT Filed: Mar. 10, 2014

(86) PCT No.: PCT/KR2014/001928
§ 371 (c)(1),
(2) Date: Aug. 28, 2015

(87) PCT Pub. No.: WO2014/142482
PCT Pub. Date: Sep. 18, 2014

(65) Prior Publication Data
US 2016/0014825 A1 Jan. 14, 2016

Related U.S. Application Data

(60) Provisional application No. 61/776,723, filed on Mar. 11, 2013, provisional application No. 61/819,666, filed on May 6, 2013.

(51) Int. Cl.
*H04W 4/00* (2009.01)
*H04W 76/02* (2009.01)
(Continued)

(52) U.S. Cl.
CPC ......... *H04W 76/021* (2013.01); *H04W 4/005* (2013.01); *H04W 8/005* (2013.01);
(Continued)

(58) Field of Classification Search
CPC .................................................... H04W 8/005
(Continued)

(56) References Cited

U.S. PATENT DOCUMENTS

| 9,036,517 | B2* | 5/2015 | Bijwe | H04W 76/022 |
| | | | | 370/310 |
| 2002/0152299 | A1* | 10/2002 | Traversat | G06F 9/4416 |
| | | | | 709/223 |

(Continued)

FOREIGN PATENT DOCUMENTS

| FI | WO 2013014641 | A1 * | 1/2013 |
| GB | 2488847 | A | 9/2012 |

(Continued)

OTHER PUBLICATIONS

PCT International Application No. PCT/KR2014/001928, Written Opinion of the International Searching Authority dated Jun. 26, 2014, 1 page.

(Continued)

*Primary Examiner* — Guang Li
(74) *Attorney, Agent, or Firm* — Lee Hong Degerman Kang & Waimey

(57) ABSTRACT

One embodiment of the present invention provides a method and an apparatus for performing device to device (D2D) service in a wireless communication system, and specifically, provides a method for using a discovery signal including an identifier which can be identified in a physical layer and the like when a terminal supporting a D2D service receives a signal related to an advertisement. The invention determines whether to receive an additional advertisement (Continued)

signal on the basis of the identifier. The discovery signal is preferably transmitted in a radio resource control (RRC) idle mode. The D2D terminal that receives the discovery signal communicates with a base station by an improved method having an improved effect with respect to power.

10 Claims, 9 Drawing Sheets

(51) Int. Cl.
    *H04W 8/00*         (2009.01)
    *H04W 28/26*     (2009.01)
    *H04W 76/04*     (2009.01)

(52) U.S. Cl.
    CPC ......... *H04W 28/26* (2013.01); *H04W 76/023* (2013.01); *H04W 76/046* (2013.01)

(58) Field of Classification Search
    USPC ........................................................ 370/329
    See application file for complete search history.

(56) References Cited

U.S. PATENT DOCUMENTS

| | | | | |
|---|---|---|---|---|
| 2007/0286136 A1* | 12/2007 | Rittle | .................... | H04W 8/005 370/338 |
| 2010/0254308 A1* | 10/2010 | Laroia | .................... | H04W 8/005 370/328 |
| 2010/0303003 A1* | 12/2010 | Park | .................... | H04L 67/20 370/328 |
| 2011/0055326 A1* | 3/2011 | Michaelis | .................... | H04W 48/08 709/204 |
| 2012/0163235 A1 | 6/2012 | Ho et al. | | |
| 2012/0179789 A1* | 7/2012 | Griot | .................... | H04W 12/08 709/220 |
| 2013/0064138 A1* | 3/2013 | Hakola | .................... | H04L 67/16 370/255 |
| 2013/0086246 A1* | 4/2013 | Lee | .................... | H04W 4/203 709/223 |
| 2013/0109301 A1* | 5/2013 | Hakola | .................... | H04W 76/023 455/39 |
| 2013/0122893 A1* | 5/2013 | Turtinen | .................... | H04W 8/005 455/423 |
| 2013/0157656 A1* | 6/2013 | Gao | .................... | H04W 76/023 455/434 |
| 2013/0157670 A1* | 6/2013 | Koskela | .................... | H04W 74/006 455/450 |
| 2013/0183963 A1* | 7/2013 | Turtinen | .................... | H04W 36/0083 455/426.1 |
| 2013/0286889 A1* | 10/2013 | Cherian | .................... | H04L 63/18 370/254 |
| 2013/0288668 A1* | 10/2013 | Pragada | .................... | H04W 12/06 455/426.1 |
| 2013/0322276 A1* | 12/2013 | Pelletier | .................... | H04W 72/085 370/252 |
| 2014/0003373 A1* | 1/2014 | Hakola | .................... | H04W 48/16 370/329 |
| 2014/0022986 A1* | 1/2014 | Wu | .................... | H04W 48/16 370/328 |
| 2014/0045422 A1* | 2/2014 | Qi | .................... | H04W 76/023 455/39 |
| 2014/0064163 A1* | 3/2014 | Tsirtsis | .................... | H04W 8/005 370/311 |
| 2014/0254429 A1* | 9/2014 | Wang | .................... | H04L 5/0037 370/254 |
| 2014/0274192 A1* | 9/2014 | Zhu | .................... | H04W 8/005 455/522 |
| 2015/0009981 A1* | 1/2015 | Choi | .................... | H04W 76/023 370/338 |
| 2015/0045016 A1* | 2/2015 | Xiong | .................... | H04W 8/005 455/426.1 |
| 2015/0131566 A1* | 5/2015 | Seo | .................... | H04B 1/3838 370/329 |
| 2015/0271846 A1* | 9/2015 | Kowalski | .................... | H04W 72/14 370/329 |
| 2015/0305075 A1* | 10/2015 | Fodor | .................... | H04W 8/005 370/329 |
| 2015/0326362 A1* | 11/2015 | Xiong | .................... | H04W 8/005 370/336 |

FOREIGN PATENT DOCUMENTS

| | | |
|---|---|---|
| KR | 10-2010-0062866 | 6/2010 |
| KR | 10-2012-0094947 | 8/2012 |
| WO | 2011/087638 | 7/2011 |
| WO | 2012088470 A1 | 6/2012 |

OTHER PUBLICATIONS

European Patent Office Application No. 14765461.0, Search Report dated Sep. 23, 2016, 12 pages.

\* cited by examiner

METHOD AND APPARATUS FOR PERFORMING DEVICE TO DEVICE SERVICE IN WIRELESS COMMUNICATION SYSTEM

CROSS-REFERENCE TO RELATED APPLICATIONS

This application is the National Stage filing under 35 U.S.C. 371 of International Application No. PCT/KR2014/001928, filed on Mar. 10, 2014, which claims the benefit of U.S. Provisional Application No. 61/776,723, filed on Mar. 11, 2013 and 61/819,666, filed on May 6, 2013, the contents of which are all hereby incorporated by reference herein in their entirety.

BACKGROUND OF THE INVENTION

Field of the Invention

The present embodiment is related to wireless communication system, and more particularly, to a method and apparatus for performing signal related to advertisements in a wireless communication system.

Related Art

Recently, commercialization of the long term evolution (LTE) system, which is the next generation of wireless communication systems, has been supported earnestly. After the necessities were recognized that mass data service is to be supported in high-quality in response to users' request as well as voice service while ensuring users' mobility, the trend is that such an LTE system has been more rapidly expanded. The LTE system provides low transmission delay, high transmission rate, high system capacity and coverage improvement.

Meanwhile, in consideration of the requests of service provider that provides services to users, seek the benefit from the improvement of performances of the existing radio access or network and the way of recouping the investment costs for wireless communication systems which have been already invested so that the LTE system has been evolved in the form of maintaining or coexisting the compatibility with 2G communication system, which is the global system for mobile communications (GSM) based on the time division multiple access (TDMA), and with 3G communication system, which is the universal mobile telecommunication system (UMTS) based on the wideband code division multiple access (W-CDMA).

Particularly, with the advent of smart phones and tablet personal computers (PCs) recently, the users of actual communication devices require the services that enable you to easily obtain or share the information desired at any place and any time they want. However, it is not easy to effectively provide real-time information that is trivial but useful for users in real life situation due to the complexity of system or time delay of the wireless communication systems.

Meanwhile, a device to device (D2D) service, which is performed through a direct communication link among communication devices, without going through a network entity such as a base station, has emerged as an issue. This may be regarded that the wireless communication system is urgently needed to be developed/improved to support the environment in which users can share and obtain various information. In relation to this, the way and technique of effective data transmission and reception in wireless communication systems, which support the D2D service, are needed.

SUMMARY OF THE INVENTION

Technical features disclosed in the present specification provide a method and apparatus for performing a device to device (D2D) communication/service in a wireless communication system.

Technical features disclosed in the present specification provide a method and apparatus for processing an advertisement signal transmitted through a D2D link.

The present specification proposes a method and apparatus for processing various signals related to an advertisement. According to one aspect, it is proposed a method for performing a first communication device supporting a device to device (D2D) service in a wireless communication system. The method includes: receiving a discovery signal including an advertisement identifier (ID) that can be identified in a physical layer of the first communication device from a second communication device supporting the D2D service in a radio resource control (RRC) idle mode; determining, in the physical layer of the first communication device, whether to receive an additional advertisement signal from the second communication device on the basis of the advertisement ID; if it is determined to receive the additional advertisement signal, setting up an RRC connection with respect to a base station in response to the discovery signal; after the RRC connection is set up, transmitting a D2D link setup request message for setting up a D2D link with respect to the second communication device to the base station on the basis of information related to the second communication device and included in the discovery signal; setting up the D2D link with respect to the second communication device by using a resource scheduled by the base station; and receiving the additional advertisement signal through the D2D link.

When communication is performed according to a method and apparatus disclosed in the specification described below, an advertisement signal transmitted through a device to device (D2D) link is properly processed, thereby avoiding user equipment processing capability and power consumption.

DESCRIPTION OF EXEMPLARY EMBODIMENTS

Figure 1:
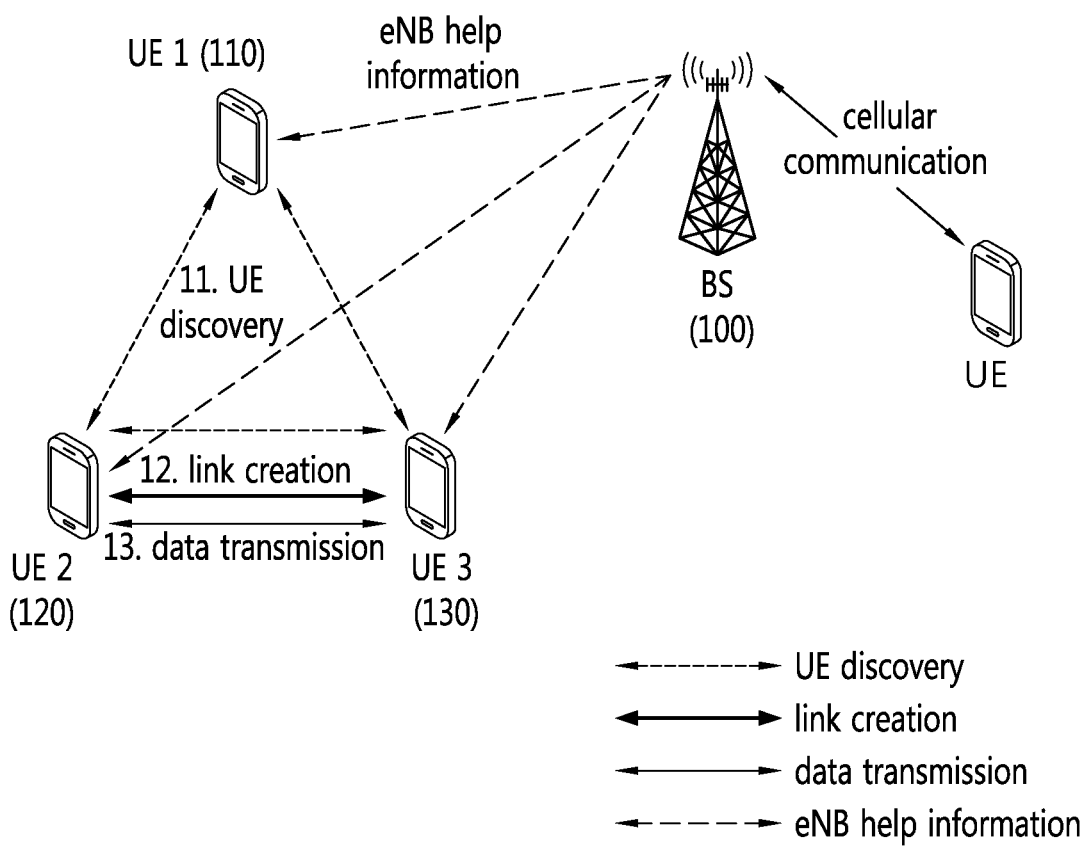
FIG. 1 schematically illustrates a structure of a wireless communication system to which the present embodiment is applied.

Hereinafter, the preferred embodiment of the present invention now will be described in detail by reference to the accompanying exemplary drawings in this specification. In attaching reference numerals to elements in each drawing, it should be understood that the same reference numeral is used for the same element even if the element is shown in different drawings. In addition, in case that the detailed description for the related known elements and functions is determined to obscure the inventive concept in this specification, the redundant description for the same element will be omitted.

In addition, the present specification describes wireless communication network as an object, the tasks performed in the wireless communication network may be performed during the process of controlling the network in the system (for example, a base station) that controls the corresponding wireless communication network and transmitting data, or performed by the user equipment that is coupled to the corresponding wireless network.

FIG. 1 schematically illustrates a structure of a wireless communication system to which the present invention is applied. The drawing depicts a network structure of evolved-universal mobile telecommunications system (E-UMTS). The E-UMTS system is also called long term evolution (LTE) or LTE-advanced (LTE-A) system, and refers to a packet based system to provide various communication services such as voice, packet data, and so on.

Referring to FIG. 1, the E-UTRAN includes an evolved-NodeB (eNB) 100 that provides a control plane and a user plane for user equipments (UEs) 110, 120 and 130. The UEs 110, 120 and 130 may be fixed or have mobility, and may be called other terms such as a mobile station (MS), an advanced mobile station (AMS), a user terminal (UT), a subscriber station (SS), a wireless device, and the like.

The eNB 100 generally refers to a station that communicates with the UEs 110, 120 and 130, and may be called other terms such as a base station (BS), a base transceiver system (BTS), an access point (AP), a femto eNB, a pico-eNB, a Home nodeB, relay, and so on. The eNB 100 may provide services for a UE through at least one cell. The cell may signify a geographical region that provides communication service by the eNB 100, or signify a specific frequency band. Or, the cell may signify downlink frequency resources and uplink frequency resources. Or, the cell may signify the combination of the downlink frequency resources and optional uplink frequency resources. In addition, the cell should be interpreted as inclusive meaning that represents a partial region which is covered by the eNB 100. And the cell may be defined as a mega cell, a macro cell, a micro cell, a pico cell, a femto cell, etc. according to the size, and the cell should be interpreted as inclusive meaning that includes all of various coverage and regions according to the present invention.

Hereinafter, downlink refers to transmission link from the eNB 100 to the UEs 110, 120 and 130, and uplink refers to transmission link from the UEs 110, 120 and 130 to the eNB 100. In downlink, a transmitter may be a part of the eNB 100 and a receiver may be a part of the UEs 110, 120 and 130. In uplink, a transmitter may be a part of the UEs 110, 120 and 130, and a receiver may be a part of the eNB 100.

Various multi access methods may be used such as Code Division Multiple Access (CDMA), Time Division Multiple Access (TDMA), Frequency Division Multiple Access (FDMA), Orthogonal Frequency Division Multiple Access (OFDMA), Single Carrier-FDMA (SC-FDMA), OFDM-FDMA, OFDM-TDMA, OFDM-CDMA in the present invention. In addition, as the uplink transmission and the downlink transmission, a Time Division Duplex (TDD) scheme transmitted using different times may be used. Or, a Frequency Division Duplex (FDD) scheme transmitted using different frequencies may be used.

Meanwhile, the physical layers applied to the present invention include a physical downlink control channel (PD-CCH), a physical control format indicator channel (PC-FICH), a physical hybrid ARQ indicator channel (PHICH), a physical uplink control channel (PUCCH), and so on. Herein, the PDCCH may carry the resource allocation and the transmission format of a downlink shared channel (DL-SCH), the resource allocation information of a uplink shared channel (UL-SCH), the paging information on a PCH, the system information of the DL-SCH, the resource allocation of higher layer control message such as a random access response transmitted on a PDSCH, the set of transmission power control command for individual UEs in an arbitrary UE group and the activation of voice over internet protocol (VoIP), and so on. The PCFICH carries the number of OFDM symbol (i.e., size of control region) which is used for transmission of control channels in a subframe. The PHICH carries Acknowledgement (ACK)/Non-acknowledgement (NACK) signals which are the response signals to a Hybrid Automatic Repeat Request (HARQ) for the uplink transmission. The PUCCH carries the uplink control information such as the HARQ ACK/NACK for downlink transmission, the scheduling request, and a channel quality indicator (CQI).

Furthermore, in recent years, the mobile internet traffic has rapidly increased, and it is anticipated that such a trend will last for the time being. While overload of cellular communication network becomes serious due to the increase of mobile traffic, service providers try to solve the overload problem by introducing LTE, femto cell, wireless LAN, and the like. Such an effort has common ground of trying to decrease the overload of eNB by replacing and expanding infra. Meanwhile, as a method of decreasing the overload without replacing and expanding infra, the D2D communication that sends and receives traffic directly among UEs without infra has been magnified. Although the definition of such a D2D communication is not clearly established at the moment, the D2D communication may signify a direct communication among UEs without any infra of network systems. This signifies a communication that directly exchanges traffic among UEs not by introducing a small eNB such as a femto cell or a pico cell and nor by an eNB. Since such a D2D communication has an advantage in proximity compared with the existing communication through infra, for example, in the aspect of power transmission, if the distance among UEs is close, the communication is available in lower power than the case of exchanging traffic with an eNB located far away, which is more effective. The advantage enables the efficiency of limited radio resources to increase whereas the load of network infra to decrease. The efficiency of limited radio resources signifies that the frequency reuse factor may also be increased since the D2D communication is available in low power and several D2D links are available to communicate even in the same cell.

Particularly, since the D2D communication based on the cellular network has advantages such as power saving, shortening access time, saving frequency resource, and so on, various researches have been published. In addition, since the applications such as social network, mobile advertisement, short distance file transfer, etc. in which mobile traffic has been rapidly increased are considered as applications that are suitable for the D2D communication, basically the demand for D2D communication is anticipated to increase more in the future.

As shown in FIG. 1, such a D2D communication procedure may include a step of peer discovery 11 for searching neighboring D2D UEs in which the D2D communication is available, a step of link generation 12 for connecting a UE which is going to transmit data among D2D UEs found in the step of peer discovery 11 to a wireless link, and a step of data transmission 13 for transmitting traffic among the UEs connected with the wireless link. Although detailed procedure may vary according to actual D2D communication method, it can be said that the above three steps are general.

In more particular, the first step for D2D communication is the step of peer discovery 11. The step of peer discovery 11 is a step that each D2D UE searches other UEs that are available to perform D2D communication nearby. In this step, each of the UEs transmits search signals such that other UEs may find the UE and receives search signals transmitted from other UEs, and finds other UEs that are available to perform D2D communication are located within a range.

The second step for D2D communication is the step of link generation 12. In the step of link generation 12, a UE which is going to transmit data among D2D UEs found in the step of peer discovery 11 is linked to transmit data. Generally, the link is established when a UE sends a signal for requesting a link generation to other UE, the corresponding UE receives the signal and sends a response signal.

When a neighboring UE is found in the step of peer discovery and a link is established among the UEs that are going to exchange data in the step of link generation, the two UEs linked each other exchange data. This step is called the step of data transmission 13. Through the step, the UEs in which D2D link is established perform data transmission on predetermined time and frequency.

Such a D2D communication technique may be divided into a D2D communication based on the cellular network and a D2D communication that does not utilize infra of the cellular network in the least. The D2D communication based on the cellular network uses the information received from an eNB in the step of peer discovery and receives a help from the cellular network when performing resource allocation and power control when transmitting data for traffic transmission. This is more effective in power saving, access time, resource application, etc. that those of the D2D communication that does not utilize infra of the cellular network.

Meanwhile, a Peer discovery technique based on the cellular network may be divided into an A-priori peer discovery technique and an A-posterior peer discovery technique based on target UE to be searched. The A-priori peer discovery technique signifies a technique of performing search among the D2D UEs in which session is not setup. The A-priori peer discovery technique based on the cellular network signifies a way of searching UE using the broadcasting information of eNB and a technique of searching UE through register/request processes by a network entity, for example, a mobile management entity (MME). Hereinafter, this will be briefly described through FIG. 2 and FIG. 3.

Figure 2:
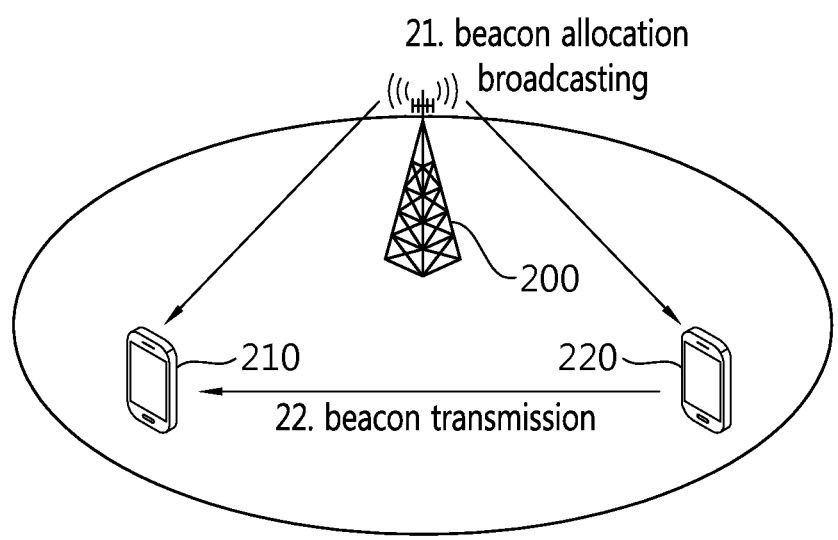
FIG. 2 schematically illustrates a peer discovery procedure using broadcasting information in a wireless communication system to which the present embodiment is applied.

FIG. 2 schematically illustrates a peer discovery procedure using the broadcasting information in a wireless communication system to which the present invention is applied. This is one of the A-priori peer discovery techniques, and a method that UEs search each other using the broadcasting information of eNB will be described.

Referring to FIG. 2, an eNB 200 continuously broadcasts that each of the UEs 210 and 220 is allocated to which beacon resource to the D2D UEs (step, 21). Each UE is available to know the beacon allocated to itself based on the broadcasting information.

Each UE receives beacon assignments that are broadcasted from the eNB, and notifies the existence of the UE to other UEs by transmitting the assigned beacon through a predetermined communication resource (step, 22). Then, each of the UEs searches which D2D UEs are present nearby by searching beacon based on the information broadcasted by the eNB on the time when the beacon is not transmitted.

Figure 3:
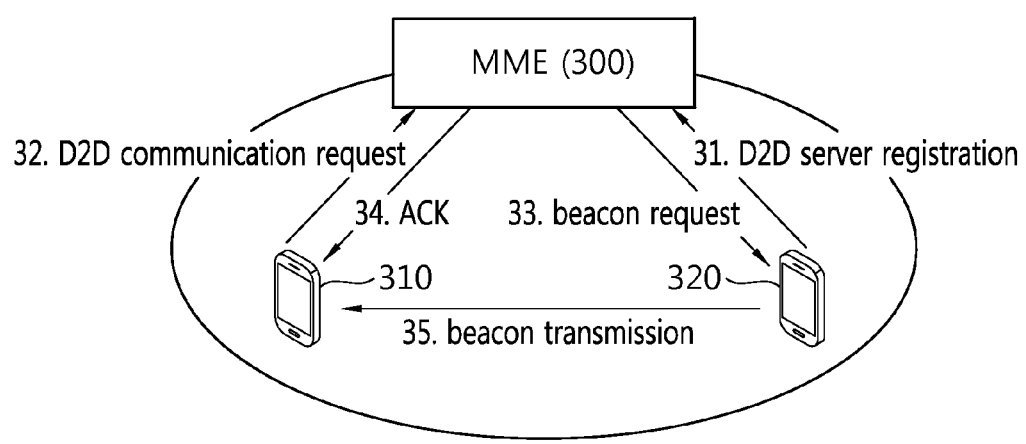
FIG. 3 schematically illustrates a peer discovery procedure using a network entity in a wireless communication system to which the present embodiment is applied.

FIG. 3 schematically illustrates a peer discovery procedure using a network entity in a wireless communication system to which the present invention is applied. This is one of the A-priori peer discovery techniques, and a method of searching UE through register/request processes to the network entity will be described.

Referring to FIG. 3, first, a server UE 310 that is going to send beacon notifies that the D2D communication is available to an MME 300, and simultaneously, registers its UE and service information (step, 31). When receiving a request from a client UE that the D2D communication is available, the MME 300 requests to send beacon to the D2D server UE by verifying if there is a server UE to communicate with the corresponding client UE based on the information of server UE which is registered (steps, 32 and 33). The server UE sends the requested beacon and the client UE receives this such that the D2D search procedure is available (steps, 34 and 35). Herein, the MME has the access information of UE or the information of UE's capacity, and the information is mainly used for the mobility management of UE. Accordingly, the method of FIG. 3 provides more information during the peer discovery procedure than that of in FIG. 2, and thereby the UEs may save resources consumed in the peer discovery.

Meanwhile, the A-posteriori peer discovery technique signifies a technique that each UE performs the peer discovery by targeting the UE existed in the same eNB among different UEs having a session which is already generated. That is, in the A-posteriori peer discovery technique, the peer discovery is, different from the A-priori peer discovery technique of searching arbitrary UEs nearby, a process of verifying whether there is a UE, which already has a session, located within a range where D2D communication is available with its own. In this reason, the A-posteriori peer discovery technique includes a method of using token and a method of analyzing internet protocol (IP) address according to a method of determining if two UEs that have a session exist in the same eNB. Hereinafter, this will be described through FIG. 4 and FIG. 5.

Figure 4:
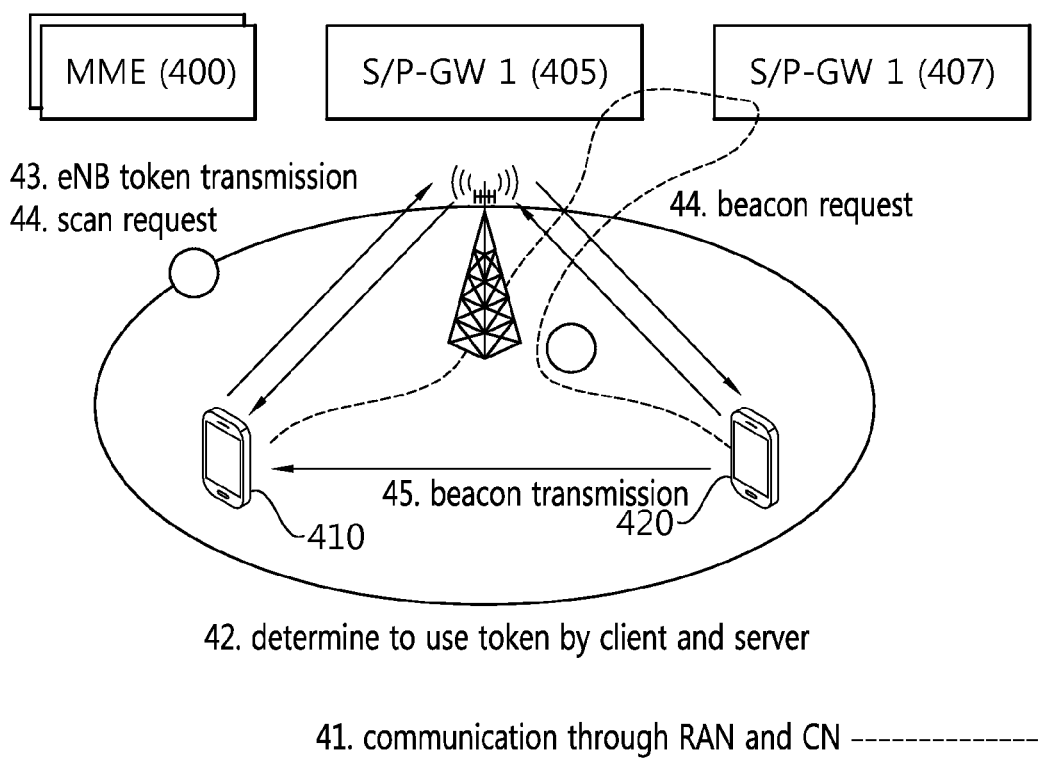
FIG. 4 schematically illustrates a peer discovery procedure using a token technique in a wireless communication system to which the present embodiment is applied.

FIG. 4 schematically illustrates a peer discovery procedure using a token technique in a wireless communication system to which the present invention is applied.

Referring to FIG. 4, the search technique using the token is a method of determining whether there exist two UEs that have a session in the same eNB using a distinctive token which is distinguishable by the eNB. When the UEs 410 and 420 that have a session, that is, the UEs that perform a communication through a radio access network (RAN) and a core network (CN) (step, 41) exchange tokens using the session of communication, the eNB may know the two UEs that have a session are in the same eNB by distinguishing the tokens (step, 42). If it is determined that two UEs are in the same eNB, the eNB requests one UE to transmit a beacon (step, 43) and requests another UE to receive the beacon (step, 44). If the beacon is properly received (step, 45), two UEs successfully complete the peer discovery and are determined to be located in the range where the D2D communication is available.

Herein, according to LTE system, the combination of E-UTRAN and EPC is called an evolved packet system (EPC), and the traffic flow that is ranged from all of wireless links through which the UEs 410 and 420 access the eNB to a packet data network that is connected to a service entity may be operated based on internet protocol (IP). An S-GW is a gateway having an endpoint of E-UTRAN, and a P-GW is a gateway having an endpoint of a packet data network. Through this, the flow of packet traffic of UEs is controlled by start/end. Thus, an MME 400 exchanges operation and management (OAM) information for supporting movement of UEs 510 and 520 with S-GW 505/P-GW 507 through S1-U. Through this, the flow of packet data according to movement of UE is controlled.

Figure 5:
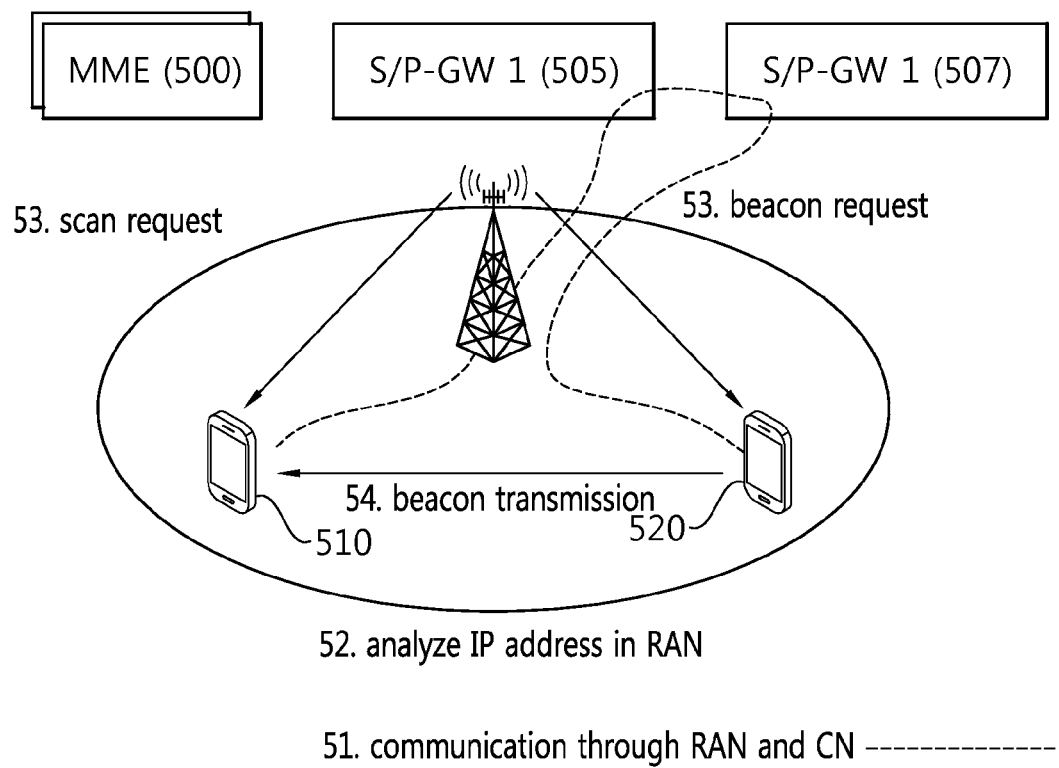
FIG. 5 schematically illustrates a peer discovery procedure considering an internet protocol address in a wireless communication system to which the present embodiment is applied.

FIG. 5 schematically illustrates a peer discovery procedure considering an internet protocol address in a wireless communication system to which the present invention is applied.

Referring to FIG. 5, a search technique using IP address analysis is a method of verifying if a transmission UE and a reception UE are in the same eNB by analyzing an IP address of a session. For the UEs that has a session generated (step, 51), that is, for the UEs that perform communication through the RAN and the CN, if two UEs are determined to be in the same eNB through the IP address analysis in S/P-gateway (GW), like the method of using tokens, the eNB requests one UE to transmit a beacon and requests another UE to receive the beacon (step, 53). If the beacon is successfully received, it is determined that the peer discovery is successful and the D2D communication is available (step, 54).

Hereinafter, on the basis of the aforementioned example or the like, a method of processing an advertisement signal based on a UE discovery technique in which UE discovery is performed by directly exchanging a beacon between UEs by an eNB will be described in greater detail in the present specification.

Hereinafter, an advertisement delivery method and a method of blocking duplicated advertisement reception are described according to the present specification.

If a UE can perform not only communication with an eNB but also communication (i.e., D2D communication) in which signals and data are directly exchanged between UEs, a user who carries the UE and passes a shop is exposed to various types of advertisements such as a sale, promotion, event, etc., provided by the shop. In particular, in a region where shops are densely located, the user may face an uncomfortable situation due to flood of advertisements while passing a street, since each shop sends an advertisement message, voice, or video. That is, if the number of times of advertising is excessive or if the user receives even unnecessary advertisements, there is a problem in that the UE consumes a long processing time and great power to receive and process the unnecessary advertisements and performs a procedure related thereto.

A communication device which exists in the shop may be a UE or transmitter supporting D2D communication, or may be an eNB or an access point (AP) including the conventional eNB capability.

A method of blocking an advertisement unnecessary to the user can be implemented in such a manner that an application program for restricting/filtering some or all advertisements is selectively installed to delete an unsolicited advertisement. If each advertisement has a specific code, the user can block the unsolicited advertisement and receive a desired advertisement at a desired time by a desired number of times by setting a configuration suitable for the user according to an advertisement field (a clothes store, a restaurant, a car, an optician, etc.), an age limit for receiving the advertisement, a time of receiving the advertisement (from a certain time to a certain time), a number of times of receiving the advertisement (in the same place, at a designated time, on a designated date, a designated week, a designated month, a designated week, etc.), and a feature of the advertisement (a sales event, a sales promotion, a free event, a free consultation, an instant meeting, etc.).

In case of using an application program performed in an upper layer, a method is performed in which an advertisement is basically received in a physical layer and is sent to the upper layer through a physical layer processing procedure, and thereafter suitability of the advertisement is determined so that the advertisement is deleted if it is not a preferred advertisement, or is displayed to a UE if it is the preferred advertisement. However, since all advertisements must be received and processed without any restriction in this processing procedure, this method is not desirable when considering UE processing capability, power consumption, etc.

Therefore, the present specification proposes a method of blocking/filtering an advertisement in advance in a lower layer such as a physical layer and a MAC layer. As described above, it is assumed that a unique code, e.g., a unique ID, exists for each advertisement, and thus an advertisement attribute can be known by using the ID. However, this advertisement ID can be determined in the lower layer, preferably, the physical layer. That is, the advertisement ID is implemented by using a physical-layer signal, and a physical-layer receiving end demodulates the advertisement ID in advance to determine whether to delete a corresponding advertisement or to deliver it to the upper layer. Alternatively, a final function of determining the advertisement attribute may exist in the MAC layer. That is, a feature of the advertisement may be finally confirmed by using a MAC layer ID, and the advertisement may be selected in the MAC layer.

Figure 6:
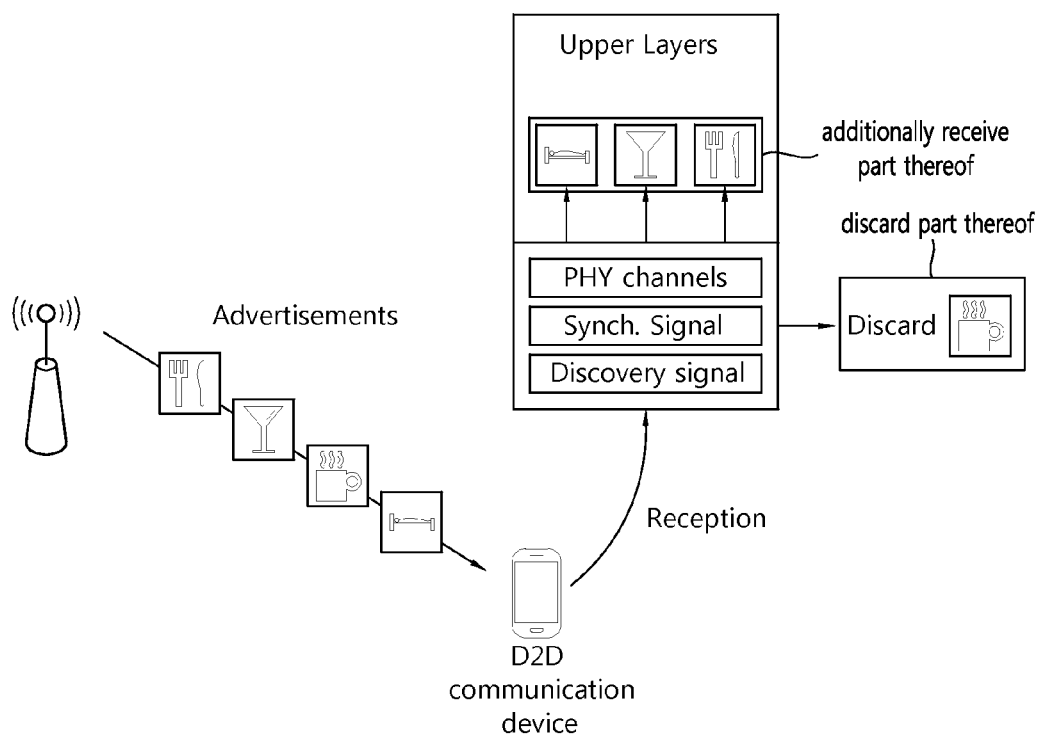
FIG. 6 illustrates the concept of a method of processing an advertisement signal according to the present specification.

FIG. 6 illustrates the concept of a method of processing an advertisement signal according to the present specification. As illustrated, a D2D communication device of a user may receive various types of advertisements. In this case, if an advertisement ID is included in a discovery signal for D2D communication, preferably in a physical layer, the advertisement ID may be detected, an additional advertisement may no longer be received, and whether to discard a related signal may be determined. The discovery signal may also have a function of a synch signal, and in this case, it is possible to determine whether to discard the signal by detecting an advertisement ID together in a synch acquisition process.

The advertisement ID may be implemented through the discovery signal. The discovery signal may be divided into a sequence and a message. The sequence may utilize the conventional sequence (e.g., DMRS, RACH, SRS, PSS, SSS sequence, etc.) used in a 3GPP LTE system. The message may include message information to be included through coding. The advertisement ID may be included in at least one of the sequence and message of the discovery signal. If the advertisement ID is included in the sequence, it may be preferentially detected on the basis of a feature of the sequence. For example, if the advertisement ID is identified through a cyclic shift or the like of the sequence, the advertisement ID may be detected without additional decoding. If the advertisement ID is not included only in the sequence or cannot be identified through the sequence, the advertisement ID may be detected through decoding for the message.

The advertisement ID may be identified by combining a variety of information included in the discovery signal. That is, the advertisement ID may be identified through any one of ID information included in a beacon message used for D2D device discovery or by combining several IDs.

Information which may be included in the beacon message may include a D2D UE's ID, a service ID, an application ID, etc. The D2D UE ID implies a unique identity information of a globally unique UE or user. For example, a user's mail address, a UE's MAC address, a telephone number, a D2D-dedicated ID, etc., may be used. The service ID is an ID determined according to a service intended to be received through D2D, and reflects a service intended to be received by the UE. Herein, a UE which uses a plurality of services can have a plurality of service IDs according thereto.

For example, the service ID may be a business type code, and the advertisement ID may be determined according to the business type code. That is, the advertisement ID may be the business type code, or may be determined by combining the business type code and other identifiers (e.g., D2D UE ID).

The user may input a specific business type code (e.g., restaurant) through an upper layer of a D2D communication device in order to block a specific advertisement. Information which is input in this manner may be delivered to a physical layer of the D2D communication device, and may be compared with the advertisement ID included in the discovery signal. If the advertisement ID detected through the discovery signal corresponds to the business type code which is input by the user, an advertisement signal from a D2D device which receives the discovery signal can be blocked.

According to one example, an advertisement ID and a signal through which an advertisement is actually transmitted (i.e., an additional advertisement signal) may be transmitted in a distinctive manner. For example, only the advertisement ID may be transmitted through the discovery signal, and an actual content of the advertisement (i.e., an additional advertisement signal) may be downloaded through an additional communication path (e.g., the Internet). In this case, the actual content of the advertisement may be received by accessing a link connected to the advertisement ID. Alternatively, a table in which an advertisement ID and an advertisement title/advertisement attribute are mapped with each other in advance may exist, so that such a mapping table is downloaded in advance. The mapping table may be received in a form of signaling by the D2D communication device from a 3GPP network, and may be received periodically from a specific Internet server or may be received in a situation in which a network is available. In a case where the advertisement ID and the additional advertisement signal are separated as described above, if only the advertisement ID signal is received through the discovery signal, the actual content can be displayed to a screen of the D2D communication device by using the mapping table including an advertisement name, advertiser, shop name, advertisement feature, advertisement type, etc., mapped to the ID. The aforementioned mapping table may be requested to be updated compulsorily by the 3GPP network, and may be updated selectively by a user of the communication device. In the update process, the D2D communication device may choose the advertisement. If it is desired to receive more advertisements, the content of the advertisement may be received directly through a wireless network, or the advertisement content may be confirmed from the Internet by accessing a link indicated by the advertisement.

Possible methods in a situation where an advertisement attribute (e.g., the aforementioned advertisement ID) can be known in a physical layer will be described. As described above, the advertisement ID may be included in a physical layer signal (e.g., a sequence of the aforementioned discovery signal). In this case, the advertisement ID is allowed to be included in the discovery signal so that the advertisement can be chosen if only the discovery signal is correctly received, which is the same as described above. Alternatively, even if the actual advertisement content (i.e., the additional advertisement signal) does not exist in the discovery signal and is transmitted through an advertisement data transmission channel at a later time, information through which an advertisement attribute can be known may be included in the discovery signal. In this case, whether an advertisement channel must be received at a later time can be determined even if only the discovery signal is received. As a result, the advertisement can be filtered on the basis of the discovery signal (i.e., sequence).

If the advertisement ID is achieved not through the discovery signal but only through data transmission, the discovery signal is inevitably received and synchronization is maintained, and an attribute of an advertisement can be known and the content of the advertisement can be known only when a D2D data channel is received at a later time. Of course, in one method, an operation of blocking the advertisement may be performed after the data transmission channel is completely demodulated.

Although the advertisement ID is preferably acquired in the physical layer, an advertisement attribute (i.e., advertisement ID) may be known in the MAC layer. If advertisement related information, in particular, information such as an ID, cannot be known in the physical layer, only when upper layer information demodulated in the physical layer is delivered to an upper layer, a corresponding content can be recognized in the upper layer. As one method, it is also possible that an advertisement ID for sending an advertisement in a MAC layer and an AP ID (when a shop transmits the advertisement through an AP, it may also be used to identify the shop) are recognized to know an attribute of the advertisement, and whether to receive (block/receive) the advertisement is determined in the MAC layer according to the attribute of the advertisement. In this case, there is a disadvantage in that demodulation must be performed by receiving all advertisements up to the physical layer.

Hereinafter, a method of handling duplicated reception will be proposed. Even if reception permission is not granted for a specific advertisement, reception may be continued, but a reception denial operation may be performed in a discovery signal level or a physical layer level or an upper layer (e.g., MAC) level by using the aforementioned technical method.

A different situation occurs when advertisement reception is allowed. Once the advertisement reception is allowed, an operation of discarding an advertisement is not performed anywhere, and thus in case of receiving the same advertisement or an advertisement having a different content but having the same advertisement code (i.e., id, code), the advertisement can be persistently received as long as a UE is continuously located within coverage capable of receiving the advertisement. Therefore, in order to avoid unnecessary duplicated reception, there is a need for a function by which, if the same advertisement is received with the same content, the advertisement is no longer received when it is received within a specific time in a duplicated manner.

Figure 7:
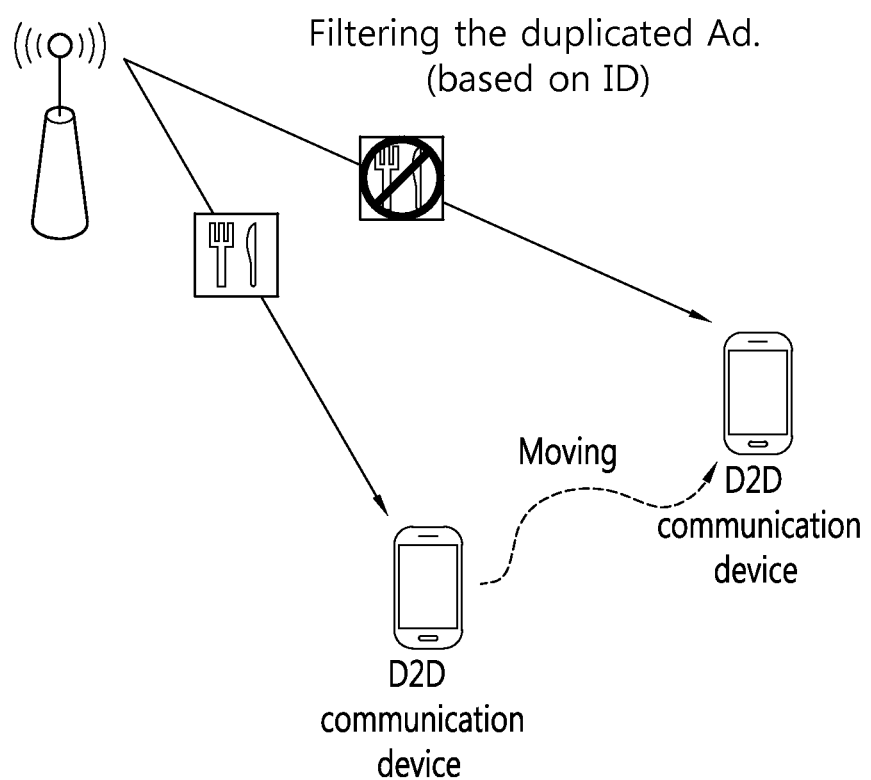
FIG. 7 illustrates the concept of processing an advertisement signal according to the present specification.

FIG. 7 illustrates the concept of the aforementioned operation. While receiving a discovery signal including a specific advertisement ID, a D2D communication device of a user may detect a corresponding advertisement ID, and may receive an actual content (i.e., an additional advertisement signal) of a corresponding advertisement. Thereafter, as shown in FIG. 7, a discovery signal may be received again from the same shop. For example, if a discovery signal including the same advertisement ID is received again, it is possible to discard the signal according to a predetermined condition described below.

The operation related to FIG. 7 can be implemented in various manners according to the aforementioned methods and steps. For example, such a reception denial operation may be performed by using a discovery signal, a synchronization signal, a physical channel, and an upper channel. Herein, in addition to a specific time, it may be limited to a specific count (e.g., limited to be greater than or equal to 1). The specific time and the specific count may be set differently according to various features such as a specific location, a specific space, a specific region, a specific situation, a specific shop, a specific AP, a specific business type, a specific brand, etc. More specifically, through a time or count of receiving a discovery signal, a time or count of receiving an advertisement may be detected, and an actual content of the advertisement (i.e., an additional advertisement signal) may be received only when a specific condition is satisfied. Alternatively, by using at least any one of a cell ID and an ID included in a beacon message, a location or space of the D2D communication device may be estimated, and the actual content of the advertisement (i.e., the additional advertisement signal) may be received only when the estimated location or space satisfies a specific condition. Alternatively, if a plurality of beacon signals are received, the location or space of the D2D communication device may be estimated by analyzing a pattern based on strength of each reception power, and the actual content of the advertisement (i.e., the additional advertisement signal) may be received only when the estimated location or space satisfies a specific condition. For example, for an advertisement of a specific business in a specific region, a condition may be predetermined such that the advertisement cannot be received two or more times in the specific region and can be received only after 7:00 pm. When such a condition is delivered to a physical layer, an advertisement ID included in the discovery signal may be compared with the condition to determine whether to receive the actual advertisement content (i.e., the additional advertisement signal).

More preferably, the aforementioned method of processing the D2D signal related to the advertisement signal (e.g., the D2D discovery signal) is performed by considering power consumption of a UE.

Figure 8:
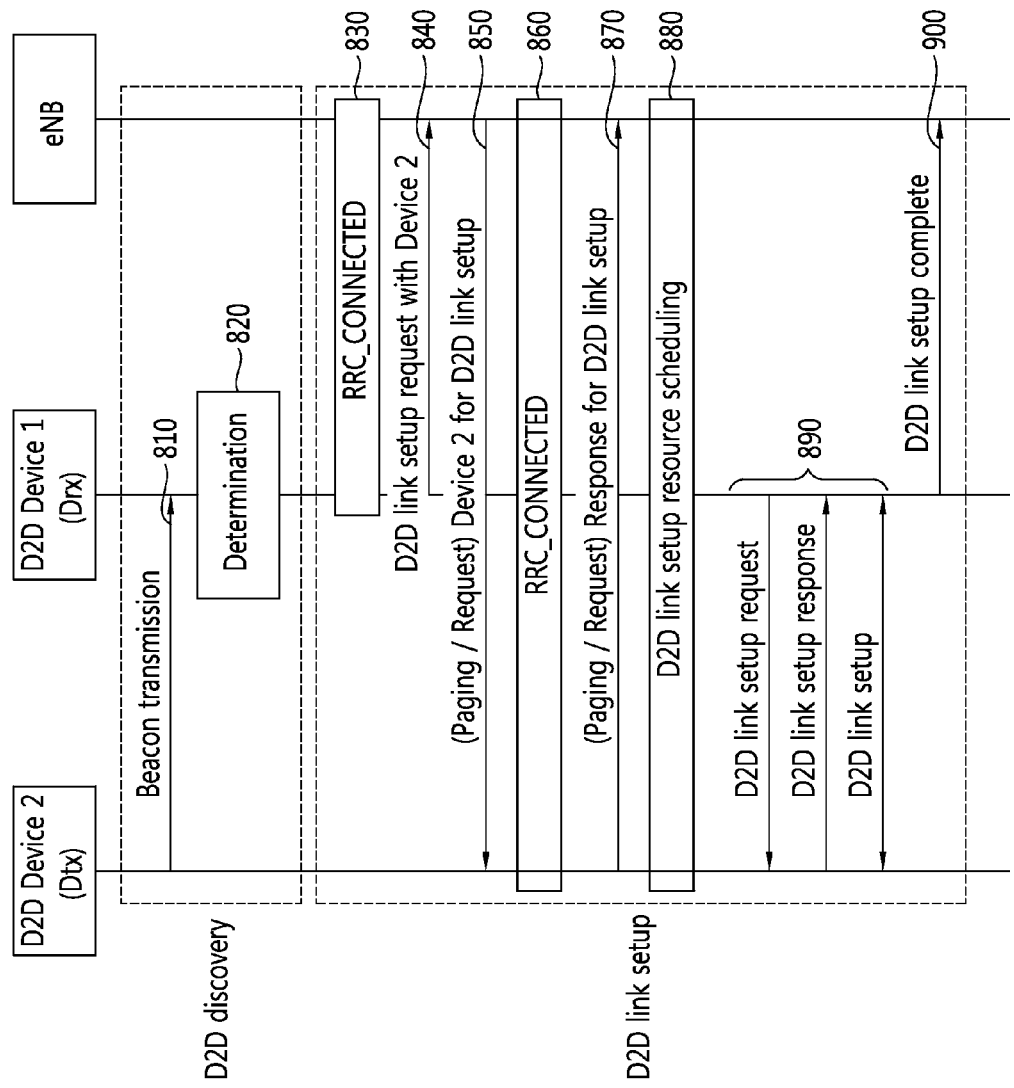
FIG. 8 is a flowchart for explaining a detailed signal processing method of a device to device (D2D) communication device for processing the aforementioned operation.

FIG. 8 is a flowchart for explaining a detailed signal processing method of a D2D communication device for processing the aforementioned operation. In FIG. 8, the D2D communication device of a user may be denoted by a first communication device (or a D2D device 1), and a transmitting device in a shop which transmits a discovery signal including an advertisement ID may be denoted by a second communication device (or a D2D device 2).

First, the D2D device 1 may receive the discovery signal in an RRC idle mode from the D2D device 2 (step 810). For example, after power is first supplied, the D2D device 1 may discover a proper cell first and thereafter may be in an RRC_idle state in the cell, or may be in a state of entering an RRC_idle mode from the previous RRC_connected mode. A discovery signal related to a D2D link may be implemented in a form of a beacon message. The aforementioned advertisement ID related to the advertisement may be included in the beacon message. As described above, the advertisement ID may be implemented by combining at least one or more identifiers. In addition, the advertisement ID may be identified by using at least any one of a sequence or message of the discovery signal.

As described above, if the advertisement ID is identified in a lower layer (preferably, a physical layer), whether to receive an actual content of the advertisement (i.e., an additional advertisement signal) is determined in the layer on the basis of the advertisement ID (step 820). If the actual content of the advertisement is not received, a related signal may be entirely discarded and the additional advertisement signal may not be received, thereby being able to preventing battery consumption of a UE while avoiding an unnecessary operation in the upper layer. The beacon message may be transmitted/received through predetermined time and frequency resources, and related time and frequency information may be broadcast to each UE or may be predetermined.

If it is determined that the D2D device 1 receives the actual content of the advertisement (i.e., the additional advertisement signal) on the basis of the advertisement ID, the D2D device 1 may receive the additional advertisement signal through the D2D device 2.

In this case, the D2D device 1 may set up an RRC connection with respect to an eNB in such a manner that a random access is performed on the eNB (step 830). If the RRC connection is set up, the D2D device 1 transmits to the eNB a D2D link setup request message to set up a D2D link with respect to the D2D device 2 (step 840). As described above, since the beacon message described in step 810 includes a variety of information such as a UE ID, service ID, application ID, emergency state ID, etc., of the D2D device 2, the D2D device 1 may request to set up the D2D link with respect to the D2D device 2, while delivering information regarding the D2D device 2 to the eNB through step 840.

In response to the request based on step 840, the eNB transmits a paging message to the D2D device 2 (step 850). In response to the paging message, an RRC connection between the D2D device 2 and the eNB is set up in the D2D device 2 (step 860), and in response to step 850, a response message for the paging is transmitted (step 870).

The eNB allocates a temporary link setup resource, which is allocated in a dedicated manner for a D2D link, to the D2D device 1 and D2D device 2 which have transitioned to the RRC_connected mode (step 880). That is, resource allocation of the D2D device 1 and the D2D device 2 may be determined in a centralized manner.

After allocating a resource dedicated for each communication device, each communication device transmits/receives setup request and setup response messages to acquire an accurate synchronization or the like, and completes the D2D link setup (step 890). If the D2D link is successfully set up, a complete report may be transmitted to the eNB (step 900).

Figure 9:
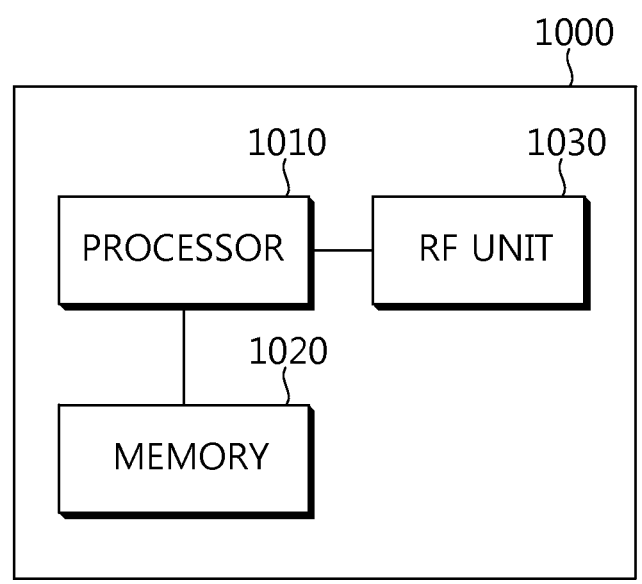
FIG. 9 is a block diagram illustrating a structure of a communication device according to the present embodiment.

FIG. 9 is a block diagram illustrating a structure of a communication device according to the present embodiment. The communication device may be implemented as a part of a UE, and may also be implemented as a part of an eNB, an HeNB, and an HNB. It may be implemented as a part of a core network (CN). A wireless device 1000 may include a processor 1010, a memory 1020, and a radio frequency (RF) unit 1030.

The processor 1010 may be configured to implement the aforementioned functions, procedures, and methods. Layers of a radio interface protocol may be implemented in the processor. The processor 1010 may perform a procedure for driving the aforementioned operation.

The processor 1010 may include an application-specific integrated circuit (ASIC), a separate chipset, a logic circuit, and/or a data processing unit. The memory 1020 may include a read-only memory (ROM), a random access memory (RAM), a flash memory, a memory card, a storage medium, and/or other equivalent storage devices. The RF unit 1030 may include a base-band circuit for processing a wireless signal. When the embodiment is implemented in software, the aforementioned methods can be implemented with a module (i.e., process, function, etc.) for performing the aforementioned functions. The module may be stored in the memory 1020 and may be performed by the processor 1010. The memory 1020 may be located inside or outside the processor 1010, and may be coupled to the processor 1010 by using various well-known means.

Various methods based on the present specification have been described by referring to drawings and reference numerals given in the drawings on the basis of the aforementioned examples. Although each method describes multiple steps or blocks in a specific order for convenience of explanation, the invention disclosed in the claims is not limited to the order of the steps or blocks, and each step or block can be implemented in a different order, or can be performed simultaneously with other steps or blocks. In addition, those ordinarily skilled in the art can know that the invention is not limited to each of the steps or blocks, and at least one different step can be added or deleted without departing from the scope and spirit of the invention.

The aforementioned embodiment includes various examples. It should be noted that those ordinarily skilled in the art know that all possible combinations of examples cannot be explained, and also know that various combinations can be derived from the technique of the present specification. Therefore, the protection scope of the invention should be determined by combining various examples described in the detailed explanation, without departing from the scope of the following claims.

What is claimed is:

1. A method to be performed by a first communication device supporting a device to device (D2D) service in a wireless communication system, the method comprising:
   receiving a discovery signal including an advertisement identifier (ID) which is identified in a physical layer of the first communication device from a second communication device supporting the D2D service in a radio resource control (RRC) idle mode;
   determining, in the physical layer of the first communication device, whether to receive an additional advertisement signal from the second communication device on the basis of the advertisement ID;
   after the first communication device determines not to receive the additional advertisement signal, discarding the discovery signal;
   after the first communication device determines to receive the additional advertisement signal, setting up an RRC connection with respect to a base station in response to the discovery signal;
   after the RRC connection is set up, transmitting a D2D link setup request message for setting up a D2D link with respect to the second communication device to the base station on the basis of information related to the second communication device and included in the discovery signal;
   setting up the D2D link with respect to the second communication device by using a resource scheduled by the base station; and
   receiving the additional advertisement signal through the D2D link,
   wherein the advertisement ID is included in one of a sequence and a message of the discovery signal,
   wherein the advertisement ID is identified through a cyclic shift of the sequence and detected without decoding for the message when the advertisement ID is included in the sequence, and
   wherein the advertisement ID is detected through decoding for the message when the advertisement ID is included in the message.

2. The method of claim 1, wherein the determining of whether to receive the additional advertisement signal from the second communication device comprises not receiving the additional advertisement signal from the second communication device, and wherein at least any one of a reception time, reception count, and reception region of the discovery signal does not satisfy a predetermined condition.

3. The method of claim 1, wherein the determining of whether to receive the additional advertisement signal from the second communication device comprises:
   comparing, in the physical layer, the advertisement ID and an advertisement blocking information which is input by a user of the first communication device through an upper layer application; and
   determining not to receive the additional advertisement signal from the second communication device, and wherein the advertisement ID corresponds to the advertisement blocking information.

4. The method of claim 1, further comprising:
   after the first communication device determines to receive the additional advertisement signal, storing the advertisement ID; and
   discarding, in the physical layer, the additional discovery signal, and wherein the additional advertisement signal including the same ID as the stored advertisement ID is received within a predetermined time duration.

5. The method of claim 1, further comprising:
   after the first communication device determines to receive the additional advertisement signal, storing the advertisement ID; and
   discarding, in the physical layer, the additional discovery signal, and wherein the additional advertisement signal including the same ID as the stored advertisement ID is received at a predetermined location of the first communication device.

6. The method of claim 1, wherein the discovery signal includes a sequence part and a message part.

7. The method of claim 1, further comprising:
   after the first communication device determines to receive the additional signal, determining, in the physical layer of the first communication device, whether a mapping table corresponding to the advertisement ID is stored in the first communication device;

obtaining advertisement contents included in the mapping table, and wherein the mapping table corresponding to the advertisement ID is stored in the first communication device; and setting up an RRC connection with respect to a base station in order to receive an additional advertisement signal from the second communication device, and wherein the mapping table corresponding to the advertisement ID is not stored in the first communication device.

8. The method of claim 7, wherein the obtaining of the advertisement contents included in the mapping table comprises accessing a server indicated in the mapping table to obtain the advertisement contents.

9. The method of claim 7, wherein the mapping table is periodically stored in the first communication device.

10. A first communication device supporting a device to device (D2D) service in a wireless communication system, comprising:

a wireless processing unit for processing a wireless signal; and a processing unit for controlling the wireless processing unit, wherein the processing unit is configured to:

receive a discovery signal including an advertisement identifier (ID) which is identified in a physical layer of the first communication device from a second communication device supporting the D2D service in a radio resource control (RRC) idle mode;

determine, in a physical layer of the first communication device, whether to receive an additional signal corresponding to the advertisement ID on the basis of the advertisement ID;

after the first communication device determines not to receive the additional signal, discard the discovery signal;

after the first communication device determines to receive the additional signal, set up an RRC connection with respect to a base station in response to the discovery signal;

after the RRC connection is set up, transmit a D2D link setup request message for setting up a D2D link with respect to the second communication device to the base station on the basis of information related to the second communication device and included in the discovery signal;

set up the D2D link with respect to the second communication device by using a resource scheduled by the base station; and receive the additional advertisement signal through the D2D link, wherein the advertisement ID is included in one of a sequence and a message of the discovery signal, wherein the advertisement ID is identified through a cyclic shift of the sequence and detected without decoding for the message when the advertisement ID is included in the sequence, and wherein the advertisement ID is detected through decoding for the message when the advertisement ID is included in the message.

* * * * *